(12) United States Patent
Dong (10) Patent No.: US 12,543,231 B2
(45) Date of Patent: Feb. 3, 2026

(54) METHOD AND DEVICE FOR COMMUNICATION ON MULTIPLE LINKS, AND COMPUTER-READABLE STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 324 days.

(21) Appl. No.: 18/017,587

(22) PCT Filed: Jul. 24, 2020

(86) PCT No.: PCT/CN2020/104504
§ 371 (c)(1),
(2) Date: Jan. 23, 2023

(87) PCT Pub. No.: WO2022/016528
PCT Pub. Date: Jan. 27, 2022

(65) Prior Publication Data
US 2023/0308869 A1 Sep. 28, 2023

(51) Int. Cl.
*H04W 76/15* (2018.01)
*H04W 12/0471* (2021.01)

(52) U.S. Cl.
CPC ........ *H04W 76/15* (2018.02); *H04W 12/0471* (2021.01)

(58) Field of Classification Search
CPC . H04W 12/0471; H04W 76/11; H04W 76/15; H04W 84/12; H04W 12/041; H04W 12/0433; H04W 76/22; H04W 76/23; H04W 76/25
See application file for complete search history.

(56) References Cited

U.S. PATENT DOCUMENTS

| | | | |
|---|---|---|---|
| 11,924,911 B2* | 3/2024 | Seok | H04W 8/005 |
| 12,058,526 B2* | 8/2024 | Wang | H04W 88/06 |
| 2010/0211790 A1* | 8/2010 | Zhang | H04L 9/321 |
| | | | 713/168 |
| 2014/0304499 A1* | 10/2014 | Gopinath | H04L 63/168 |
| | | | 713/151 |
| 2016/0218866 A1* | 7/2016 | Patil | H04W 12/041 |

(Continued)

FOREIGN PATENT DOCUMENTS

CN 109417740 A 3/2019

OTHER PUBLICATIONS

PCT/CN2020/104504 English translation of International Search Report dated Apr. 25, 2021, 2 pages.

*Primary Examiner* — Greg C Bengzon
(74) *Attorney, Agent, or Firm* — Cozen O'Connor (57) ABSTRACT

A method for a communication between terminals on multiple links includes sending a first request message frame for establishing the multiple links; in which the first request message frame at least includes a first identifier configured to indicate to use a same pairwise master key to negotiate a session key on each of the established multiple links. A second request message frame for establishing an initial association link may be sent, where the second request message frame at least includes a capability information identifier related to the communication on the multiple links.

13 Claims, 4 Drawing Sheets

(56) References Cited

U.S. PATENT DOCUMENTS

| | | | |
|---|---|---|---|
| 2017/0180496 A1* | 6/2017 | Comstock | H04L 67/146 |
| 2018/0054847 A1* | 2/2018 | Cariou | H04W 28/0861 |
| 2018/0183723 A1* | 6/2018 | Cariou | H04L 69/22 |
| 2018/0184428 A1* | 6/2018 | Cariou | H04W 12/06 |
| 2021/0100051 A1* | 4/2021 | Ho | H04W 12/033 |
| 2021/0160941 A1* | 5/2021 | Patil | H04W 74/0808 |
| 2021/0227547 A1* | 7/2021 | Chitrakar | H04W 52/0216 |
| 2021/0345105 A1* | 11/2021 | Peer | H04W 12/06 |
| 2021/0345390 A1* | 11/2021 | Okamura | H04B 7/06966 |
| 2021/0385006 A1* | 12/2021 | Ryu | H04L 5/0098 |
| 2022/0141785 A1* | 5/2022 | Gan | H04W 56/0005 370/350 |
| 2022/0167256 A1* | 5/2022 | Kneckt | H04W 12/037 |
| 2023/0032665 A1* | 2/2023 | Wang | H04W 12/041 |

\* cited by examiner

METHOD AND DEVICE FOR COMMUNICATION ON MULTIPLE LINKS, AND COMPUTER-READABLE STORAGE MEDIUM

CROSS-REFERENCE TO RELATED APPLICATION

This application is a U.S. national phase of International Application No. PCT/CN2020/104504, filed on Jul. 24, 2020, the entire content of which is incorporated herein by reference.

FIELD

The disclosure relates to the field of communication, and more particularly, to a method for a communication on multiple links and a device for a communication on multiple links, and a computer-readable storage medium.

BACKGROUND

In the IEEE802.11be standard for wireless communication networks, a station (STA) and an access point (AP) can be multi-link devices (MLDs), that is, they may support a function of simultaneous transmission and/or reception on multiple links at the same moment. Therefore, as defined by the IEEE802.11be standard, there may be a feature of providing multiple links between the STA and the AP, and the session key negotiation mechanism in the existing standard may not satisfy needs of providing multiple links.

SUMMARY

A method for a communication on multiple links is provided. The method includes: sending a first request message frame for establishing the multiple links; in which the first request message frame at least includes a first identifier configured to indicate to use a same pairwise master key to negotiate a session key on each of the established multiple links.

An electronic device is provided. The electronic device includes: a memory, a processor, and a computer program that is stored in the memory and capable of running in the processor. The processor is configured to perform the above-mentioned method when executing the computer program.

A computer-readable storage medium is provided. The computer-readable storage medium has stored therein a computer program that, when executed by a processor, causes the above-mentioned method to be performed.

BRIEF DESCRIPTION OF THE DRAWINGS

The above and other features of embodiments of the disclosure will be more apparent by describing the embodiments of the disclosure in detail with reference to the accompanying drawings, in which.

DETAILED DESCRIPTION

The following description with reference to the accompanying drawings is provided to facilitate a comprehensive understanding of various embodiments of the disclosure defined by the appended claims and their equivalents. The various embodiments of the disclosure include various details, but these details are only illustrative. In addition, the description of well-known technologies, functions, and constructions may be omitted for clarity and conciseness.

Terms and words used in the disclosure are not limited to written meanings, but are used by inventors to enable a clear and consistent understanding of the disclosure. Therefore, for those skilled in the art, the description of various embodiments of the disclosure is provided only for the purpose of illustration, but not for the purpose of limitation.

It should be understood that "a", "an", "said", and "the" in singular forms used herein can also include plural forms, unless clearly indicated in the context otherwise. It should be further understood that the word "include" used in the disclosure refers to the existence of described features, integers, steps, operations, elements, and/or assemblies, but does not exclude the existence or addition of one or more other features, integers, steps, operations, elements, assemblies, and/or groups thereof.

It will be understood that although the terms "first" and "second" and the like can be used herein to describe various elements, these elements should not be limited by these terms. These terms are only used to distinguish one element from another. Therefore, a first element discussed below may be referred to as a second element without departing from the teaching of the embodiments.

It should be understood that when an element is referred to as being "connected" or "coupled" to another element, it may be directly connected or coupled to other elements, or intervening elements may also exist. In addition, as used herein, "connected" or "coupled" may include wireless connection or wireless coupling. The term "and/or" or the expression "at least one of . . . " used herein includes any and all combinations of one or more related listed items.

The embodiments of the disclosure will be described in detail below with reference to the accompanying drawings.

Figure 1:
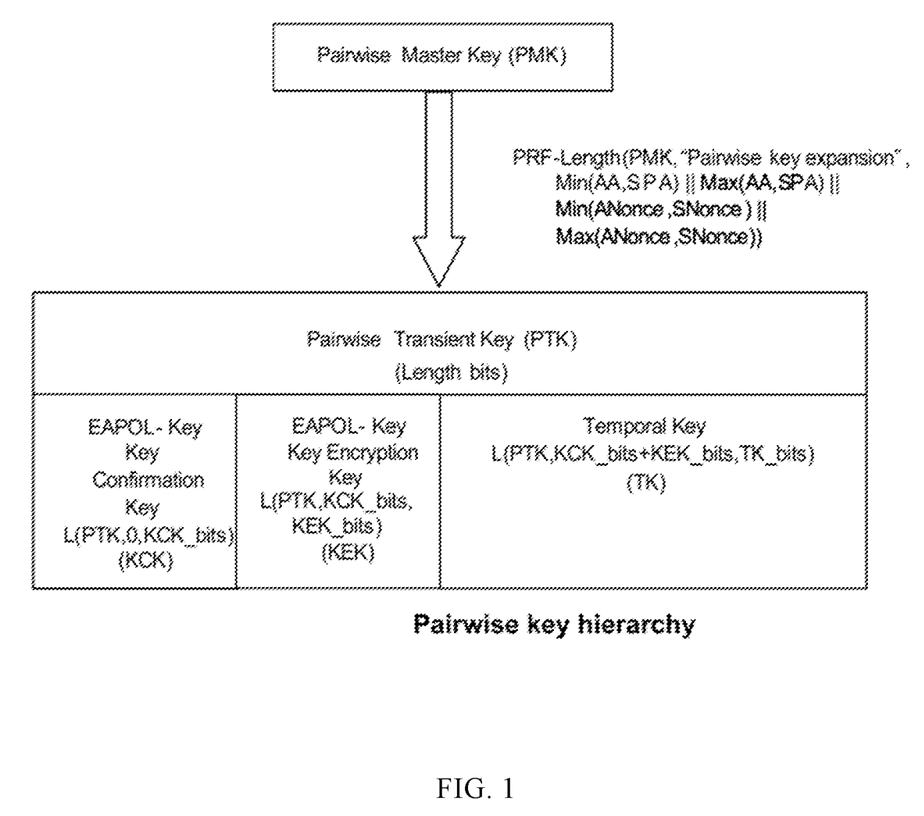
FIG. 1 is a diagram illustrating an example of a hierarchical structure of a session key.

FIG. 1 is a diagram illustrating an example of a hierarchical structure of a session key.

As mentioned above, various keys can be generated between the STA and the AP through the four-step handshake mechanism, and the key hierarchical structure is illustrated in FIG. 1. In this case, the STA may be referred to as a supplicant and the AP may be referred to as an authenticator. Referring to FIG. 1, the pairwise master key (PMK) can be pre-obtained in various ways, for example, obtained directly from the pre-shared key (PSK) or derived from the master session key (MSK). For clarity and conciseness, embodiments of the disclosure may not describe in detail.

The PMK can be converted into the pairwise transient key (PTK) by the following PRF-Length function.

$$PTK \leftarrow PRF\text{-Length}(PMK, \text{"Pairwise key expansion"}, \text{Min}(AA, SPA) \| \text{Max}(AA, SPA) \| \text{Min}(ANonce, SNonce) \| \text{Max}(ANonce, SNonce))$$

In the PRF-Length function, Length represents the length of the generated PTK, "Pairwise key expansion" represents the expansion of the pairwise key, AA represents the MAC address of the authenticator (e.g., the AP), SPA represents the MAC address of the supplicant (e.g., the STA), ANonce represents the random number generated by the authenticator (for example, the AP), and SNonce represents the random number generated by the supplicant (for example, the STA).

During the four-step handshake process, the authenticator (for example, the AP) sends the generated random number ANonce to the supplicant (for example, the STA); the supplicant (for example, the STA) generates the PTK based on the received ANonce and its own SNonce; then between the supplicant (e.g., the STA) and the authenticator (e.g., the AP), through the further negotiation using PKT, the key confirmation key (KCK), the key encryption key (KEK), and the temporary key (TK) are generated and authenticated. After the four-step handshake is completed, an update group key handshake may also be performed between the authenticator (e.g., the AP) and the supplicant (e.g., the STA), which are not described in detail in embodiments of the disclosure for clarity and conciseness.

In short, between the AP and the STA, the negotiation of the session key can be performed using their respective random numbers (i.e., ANonce and SNonce). The authenticator (e.g., the AP) generates the random number ANonce in the same way as the supplicant (e.g., the STA) generates the random number SNonce. That is, hereinafter, when the random number (Nonce) is used, the random number (Nonce) may represent the random number ANonce of the authenticator (e.g., the AP) or the random number of the supplicant (e.g., the STA) according to the corresponding object.

Nonce can be generated by the following PRF-256 function.

$$PRF\text{-}256(\text{Random number},\text{"Init Counter"},\text{Local } MAC \text{ Address}\|\text{Time})$$

Random number represents, for example, a 256-bit random number, "Init Counter" represents the initial counter value, Local MAC Address represents the address (AA or SPA) of the authenticator (for example, the AP) or the supplicant (for example, the STA), and Time represents the current time according to the Network Time Protocol (NTP) or any other time in NTP format that is feasible.

According to the PRF-256 function, the random number Nonce is strictly related to parameters such as Time.

In the 802.11be standard, the following situations can exist. The 802.11be standard supports: after multiple links are established between two multi-link devices (MLDs), in the multiple links, the same PMK and the same PTK are used for the same packet number (PN) space of pairwise transient key security association (PTKSA).

The session key negotiation mechanism in the existing standard does not consider the multi-link situation, so it may not satisfy requirements of the multiple links, so the session key negotiation mechanism in the existing standard needs to be enhanced.

Figure 2:
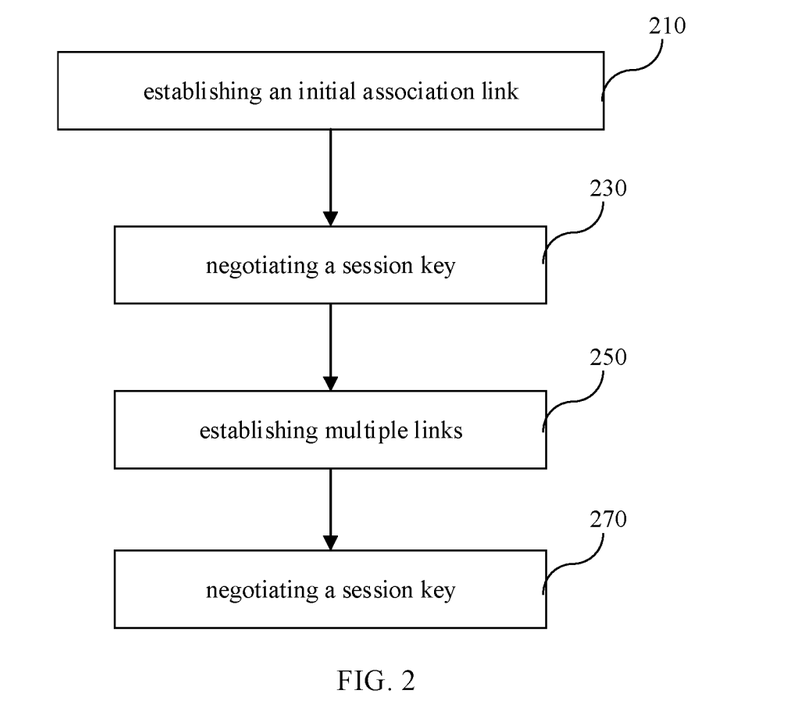
FIG. 2 is a flow chart illustrating a method for a communication on multiple links according to some embodiments of the disclosure.
Figure 4:
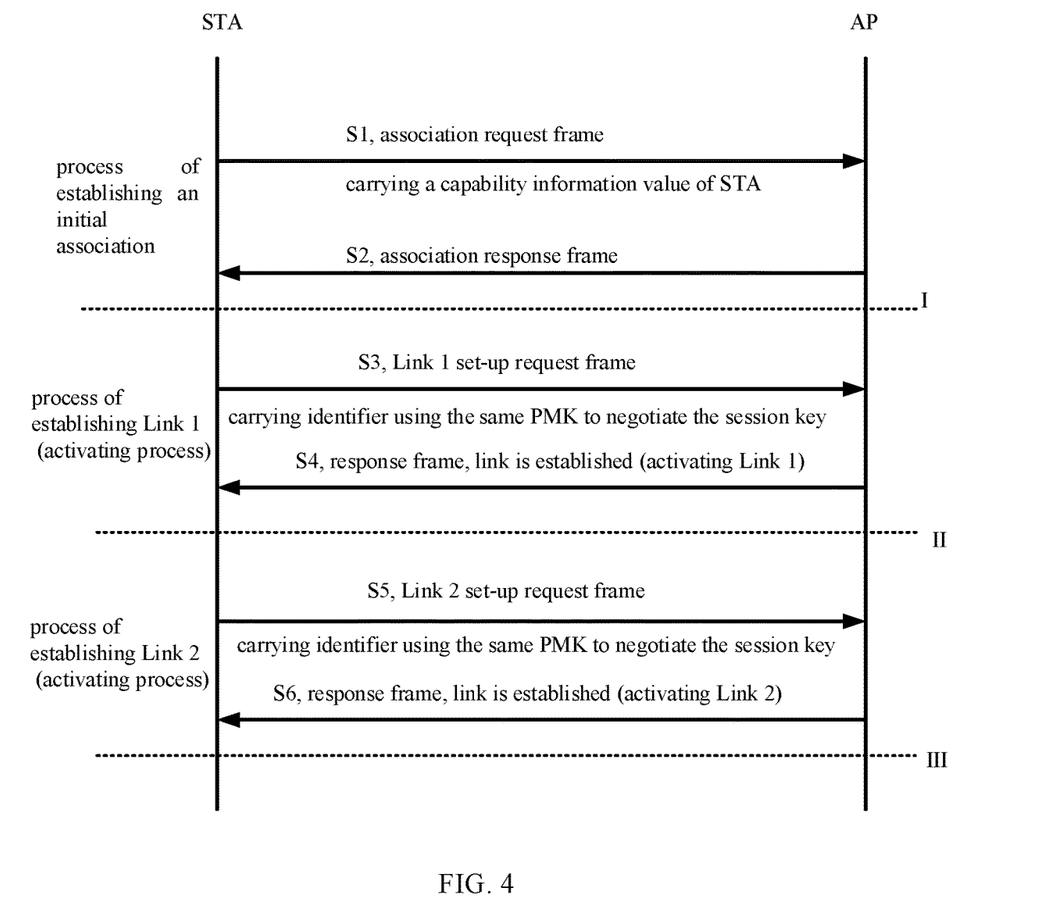
FIG. 4 is a diagram illustrating a communication scenario on multiple links according to some embodiments of the disclosure.

FIG. 2 is a flow chart illustrating a method for a communication on multiple links according to some embodiments of the disclosure. FIG. 4 is a diagram illustrating a communication scenario on multiple links according to some embodiments of the disclosure.

In FIG. 2 and FIG. 4, the communication process between the STA and the AP is illustrated as an example. In some embodiments of the disclosure, the STA can represent any type of transmitting terminal device and the AP can represent any type of receiving terminal device. For example, the AP may include a software application and/or circuitry to enable other types of nodes in the wireless network to communicate through the AP with outside and inside the wireless network. In some examples, the AP may be a terminal device or a network device equipped with a wireless fidelity (Wi-Fi) chip. By way of example, the STA may include, but is not limited to, a cellular phone, a smart phone, a wearable device, a computer, a personal digital assistant (PDA), a personal communication system (PCS) device, a personal information manager (PIM), a personal navigation device (PND), a global position system (GPS), a multimedia device, an Internet of Things (IoT) device, or the like.

In addition, in some embodiments of the disclosure, the STA and the AP may support the multi-link function. For the ease of description, in the following, it is assumed that the AP is fully functional, that is, the function supported by the STA may also be fully supported by the AP. However, this is only exemplary and some embodiments of the disclosure are not limited thereto. Furthermore, multiple links between the STA and the AP may represent multiple channels between the STA and the AP in different frequency bands. In the following, for the convenience of description, the established initial association link is described separately from the established multiple links (e.g., Link 1 and Link 2), but it is understood that the initial association link may be one of the multiple links between the STA and the AP, that is, the established initial association link and the established multiple links (for example, Link 1 and Link 2) may be collectively referred to as the multiple links, and in addition, the established multiple links (for example, Link 1 and Link 2) may also be referred to as links other than the initial association link in the multiple links.

Referring to FIG. 2, in step 210, an initial association link may be established between the STA and the AP. In detail, a method for a communication on multiple links according to some embodiments of the disclosure may include: sending a second request message frame for establishing an initial association link; and receiving a second response message frame for the second request message frame. Step 210 of FIG. 2 may correspond to the process of establishing an initial association of FIG. 4, that is, operation 51 and operation S2 of FIG. 4. In the following description, the second request message frame may correspond to the association request frame in operation 51 and the second response message frame may correspond to the association response frame in operation S2.

Referring to FIG. 2 and FIG. 4, in operation 51, on one link (or channel), the STA may transmit an association request frame to the AP. According to some embodiments of the disclosure, the association request frame (i.e., the second request message frame) may include at least a capability information identifier related to the communication on the multiple links.

As an example, the method for a communication on multiple links according to some embodiments of the disclosure may further include: determining a value corresponding to the capability information identifier. According to some embodiments, the capability information identifier related to the multi-link communication capability of the STA may be determined according to the function and configuration of the STA. Optionally, the capability information identifier can be pre-written in the STA when the STA device is manufactured, and then when the STA initiates the establishment of the initial association link with the AP, the pre-written capability information identifier can be directly obtained, and the capability information identifier can be included in the association request frame to be sent. According to different functions and configurations of the STA, the capability information identifier may correspond to different values. According to some embodiments of the disclosure, the capability information identifier corresponding to a first value (e.g., 1) may indicate that simultaneous transmission and reception on the multiple links are supported, the capability information identifier corresponding to a second value (e.g., 2) may indicate that simultaneous transmission or reception on the multiple links is supported, or the capability information identifier corresponding to a third value (e.g., 3) may indicate that transmission and reception on one link is supported (e.g., transmission and reception based on a "time division" mechanism).

Continuing to refer to FIG. 4, in operation S2, the STA may receive an association response frame for the association request frame from the AP. When the STA receives the association response frame from the AP, the establishment of the initial association link between the STA and the AP is completed. Since the capability information identifier related to the multi-link communication is included in the association request frame, operations S1 and S2 may represent the process of multi-link awareness.

Referring back to FIG. 2, in step S230, key negotiation may be performed on the initial association link. Step S230 of FIG. 2 may correspond to Phase I of FIG. 4, that is, the method for a communication on multiple links according to some embodiments of the disclosure may further include: in response to receiving the second response message frame (in response to completing the establishing of the initial association link), negotiating the session key using the pairwise master key on the initial association link. The pairwise master key may be the PMK described with reference to FIG. 1.

According to some embodiments of the disclosure, negotiating the session key using the pairwise master key includes: generating a first random number on the initial association link based on a current time parameter on the initial association link; and obtaining a first session key based on the pairwise master key and the first random number on the initial association link.

In an example, the following formula (1) can be used to generate the first random number on the initial association link based on the current time parameter Time 1 on the initial association link.

$$PRF\text{-}256(\text{Random number,"Init Counter",Local } MAC\ Address\|\text{Time 1}) \quad (1)$$

In formula (1), the time parameter Time 1 is the current time according to the NTP or any other time in NTP format that is feasible.

In an example, using formula (1), the STA can generate the random number based on the MAC address of the STA and the current time parameter Time 1; negotiate with the AP and obtain the session key according to the pairwise master key and the generated random number.

In an example, using formula (1), the AP can generate the random number ANonce based on the local MAC address of the AP on the initial association link and the current time parameter Time 1; negotiate with the STA and obtain the session key according to the pairwise master key and the generated random number.

In an example, when the session key is negotiated by, for example, the four-way handshake mechanism, the AP can utilize formula (1) to generate the random number ANonce based on the local MAC address of the AP on the initial association link and the current time parameter Time 1, and send the ANonce to the STA; the STA can use formula (1) to generate the random number SNonce based on the MAC address of the STA on the initial association link and the current time parameter Time 1; and then the STA can negotiate with the AP and obtain the session key (for example, TK, KEK, KCK, etc.) according to the pairwise master key PMK, the received random number ANonce, and the generated random number SNonce.

Referring back to FIG. 2, in step S250, multiple links may be established between the STA and the AP. In detail, the method for a communication on multiple links according to some embodiments of the disclosure may further include: sending a first request message frame for establishing the multiple links; and receiving a first response message frame for the first request message frame. According to some embodiments, the first request message frame includes at least a first identifier configured to indicate to use the same pairwise master key to negotiate the session key on each of the established multiple links.

In step 270, the session key may be negotiated on the established multiple links. IN detail, the method for a communication on multiple links according to some embodiments of the disclosure may further include: in response to receiving the first response message frame on a link to perform communication in the multiple links, negotiating the session key using the same pairwise master key on the link to perform communication. That is, in some embodiments, after the link to perform communication is established, the session key is negotiated on the established link. Additionally, the same pairwise master key is used when negotiating the session key on each link. In addition, the pairwise master key used on each link may also be the same as the pairwise master key used on the initial association link.

According to some embodiments of the disclosure, negotiating the session key using the same pairwise master key includes: generating a second random number on the link to perform communication based on a current time parameter on the link to perform communication; and obtaining a second session key based on the pairwise master key and the second random number on the link to perform communication. As an example, the second random number may be generated using the following formula (2).

$$PRF\text{-}256(\text{Random number,"Init Counter",Local } MAC\ Address\|\text{Time2/Time3/Time4/} \ldots) \quad (2)$$

In formula (2), Time 2/Time 3/Time 4/ . . . may represent the current time parameters of each link to perform communication. In some embodiments, Time 2/Time 3/Time 4/ . . . can be directly represented as Time n, where n is related to each link to perform communication, as will be described in detail later with reference to FIG. 4. In addition, the Local MAC Address may be different on each link to perform communication.

Steps S250 and 270 of FIG. 2 will be described in detail below with reference to FIG. 4.

In FIG. 4, for the conciseness and clarity, the other links in the multiple links except the initial association link only include two links (Link 1 and Link 2). However, this is only an example, and some embodiments of the disclosure are not limited to this, for example, a larger number of links are also possible.

Hereinafter, the first request message frame described in step S250 of FIG. 2 may correspond to the set-up request frame of Link 1 of operation S3 in FIG. 4 and the set-up request frame of Link 2 of operation S5; the first response message frame described in step S250 of FIG. 2 may correspond the response frame of operations S4 and S6 in FIG. 4. In addition, the first request message frame related to multiple links to be established, for example, a multi-link set-up request frame, may also be sent on one link.

When communication is to be performed on Link 1, the establishment process of Link 1 (which may also be referred to as an activation process) is performed. In the process of establishing Link 1, the STA may send a Link 1 set-up request frame to the AP on the channel corresponding to Link 1 (S3); and then receive a response frame about the Link 1 set-up request frame from the AP (that is, the first response message frame) (S4). When the STA receives the first response frame from the AP, it indicates that the establishment of Link 1 is completed or Link 1 is activated.

In Phase II, the session key is negotiated on Link 1 in response to the STA receiving the first response frame (S4) on Link 1, i.e., in response to Link 1 to perform communication being activated.

When communication is to be performed on Link 2, the establishment process of Link 2 is performed. The establishment process of Link 2 is similar to that of Link 1, and repeated descriptions are omitted for conciseness.

In Phase III, the session key is negotiated on Link 2 in response to the STA receiving the first response frame (S6) on Link 2, i.e., in response to Link 2 to perform communication being activated.

In Phase II and Phase III, according to the first identifier included in the first request message frame sent in operations S3 and S4, the same pairwise master key is used when negotiating session keys under Link 1 and Link 2.

The negotiated session keys in Phase II and Phase III are similar to the negotiated session key in Phase I, and repeated descriptions are omitted for conciseness. As an example, when negotiating the session key on Link 1, "Time 2/Time 3/Time 4/ . . . " or "Time n" in formula (2) is the current time parameter Time 2 related to Link 1; when negotiating the session key on Link 2, "Time 2/Time 3/Time 4/ . . . " or "Time n" in formula (2) is the current time parameter Time 3 related to Link 2.

In addition, the session key negotiated on Link 1 and the session key negotiated on Link 2 may be collectively referred to as the second session key described in step S270 of FIG. 2. Referring to formulas (1) and (2), although the same pairwise master key is used when negotiating the session key, since the initial association link and the link to perform communication are transmitted asynchronously, their Time are different. Although the same pairwise master key is used when negotiating the session key, the first session key and the second session key are different from each other due to the different Time.

In an example, the establishment of the respective links to perform communication (e.g., Link 1 and Link 2) and the negotiation of the session keys may be asynchronous. In this case, the second session keys of the respective links to perform communication may be different, and each second session key may be different from the first session key of the initial association link.

In an example, the establishment of the respective links to perform communication (e.g., Link 1 and Link 2) and the negotiation of the session keys may be synchronous or parallel. In this case, the second session keys of the respective links to perform communication may be the same, but the second session key may be different from the first session key of the initial association link.

Figure 3:
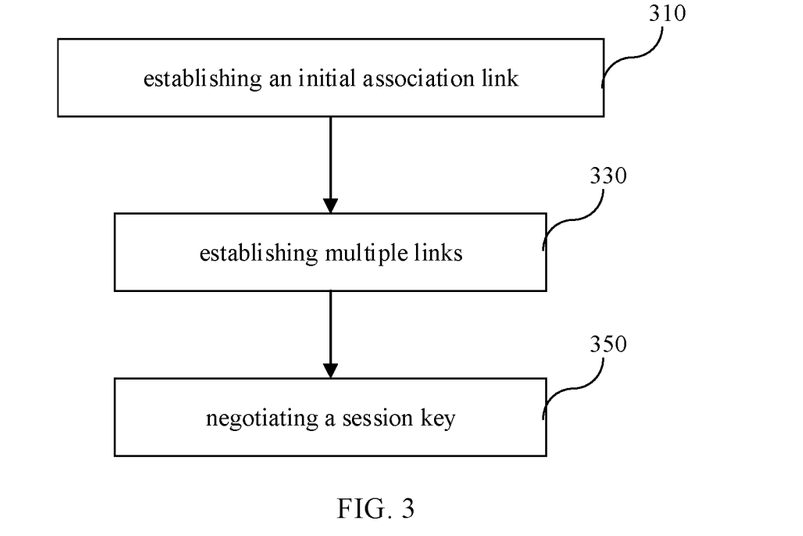
FIG. 3 is a flow chart illustrating another method for a communication on multiple links according to some embodiments of the disclosure.

FIG. 3 is a flow chart illustrating a method for a communication on multiple links according to other embodiments of the disclosure. The description will be made below with reference to FIGS. 3 and 4 together.

Referring to FIG. 3, in step 310, an initial association link may be established between the STA and the AP. Step 310 is similar to step 210 in FIG. 2, and repeated descriptions are omitted for conciseness.

In step 330, multiple links may be established between the STA and the AP. In detail, in response to receiving the second response message frame (i.e., in response to completing the initial association link), the multiple links may be established according to the capability information identifier. For example, the AP may select to establish at least one link or all of the multiple links from among multiple links supported by the STA, e.g., according to the communication environment or channel conditions.

The process of establishing multiple links in step 330 is similar to the process of establishing Link 1 and Link 2 in FIG. 4, and repeated descriptions are omitted for conciseness. It will be appreciated that in step 330 the establishment of multiple links may be performed synchronously or in parallel.

In step 350, the session key may be negotiated substantially simultaneously on the established initial association link and the established multiple link. In detail, in response to receiving the corresponding first response message frame on each link in the established multiple links (that is, in response to the completion of establishment or activation of all the links that need to be established), on the initial association link and the established multiple link, the same pairwise master key is used to negotiate the session key. That is, after all links (including the established initial association link and the established multiple links) are activated, the key negotiation is performed.

According to some embodiments of the disclosure, negotiating the session key using the same pairwise master keys includes: generating a corresponding third random number on each of the multiple links and the initial association link based on a current time parameter on each of the multiple links and the initial association link; and obtaining a corresponding third session key based on the pairwise master key and the corresponding third random number, on each of the multiple links and the initial association link. As an example, the third random number can be generated using the following formula (3).

$$PRF\text{-}256(\text{Random number,"Init Counter",Local }MAC\text{ Address}\|Time1/Time2/Time3/Time4/\ldots) \quad (3)$$

In formula (3), Time 1/Time 2/Time 3/Time 4/ . . . may represent the current time parameter of each link in the initial association link and the established multiple links. In some embodiments, Time 1/Time 2/Time 3/Time 4/ . . . can be directly represented as Time m, where m is related to the initial association link and each of the multiple links established, which will be referred to later FIG. 4 is described in detail. Furthermore, the Local MAC Address may be different on each of the initial association link and the established multiple link.

In some embodiments, Phase I and Phase II in FIG. 4 may be omitted, and in Phase III, the same pairwise master may be used substantially synchronously on each of the initial association link, Link 1 and Link 2 to negotiate the session key. The process of negotiating the session key on each of the initial association link, Link 1 and Link 2 is similar to the above-mentioned Phase I, Phase II and Phase III, and repeated descriptions are omitted herein.

According to some embodiments, in Phase III, the corresponding session key on the initial association link, the corresponding session key on Link 1, and the corresponding session key on Link 2 may be collectively referred to as the third session key. Since in Phase III, session key negotiation can be performed basically synchronously on the initial association link, Link 1 and Link 2, that is, basically synchronously sending or transmitting various message frames, the Time value on each link is the same, so the corresponding third session key on each link may be identical to each other.

The above method provided according to embodiments of the disclosure enables the session key generation mechanism to satisfy requirements of multiple links and improve the network throughput.

Figure 5:
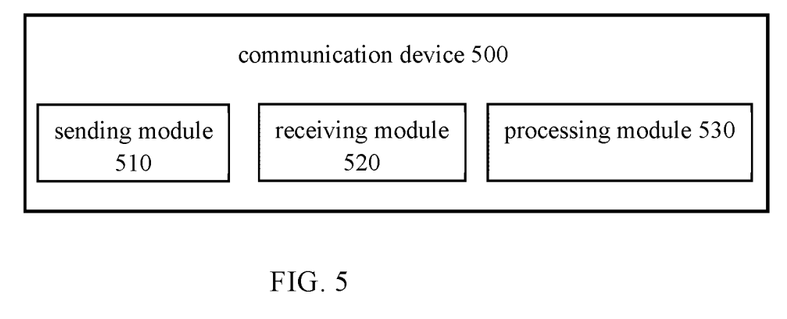
FIG. 5 is a diagram illustrating a communication device according to some embodiments of the disclosure.

FIG. 5 is a diagram illustrating a communication device 500 according to some embodiments of the disclosure. The communication device 500 may be a control device on the STA side. For example, the communication device 500 may be located within the STA or may be located outside the STA but may communicate with the STA. In addition, the configuration of the communication device 500 in FIG. 5 is only exemplary, and embodiments of the disclosure are not limited thereto, for example, the communication device 500 may further include more or less configurations.

Referring to FIG. 5, the communication device 500 may include a sending module 510, a receiving module 520, and a processing module 530.

According to some embodiments of the disclosure, the sending module 510 may be configured to send a first request message frame for establishing the multiple links, in which the first request message frame includes at least a first identifier configured to indicate to use a same pairwise master key to negotiate a session key on each of the established multiple links.

According to some embodiments of the disclosure, the sending module 510 may be further configured to send a second request message frame for establishing an initial association link, in which the second request message frame at least includes a capability information identifier related to the communication on the multiple links.

According to some embodiments of the disclosure, the processing module 530 may be configured to determine a value corresponding to the capability information identifier. According to some embodiments of the disclosure, the capability information identifier corresponding to a first value indicates that simultaneous transmission and reception on the multiple links are supported; the capability information identifier corresponding to a second value indicates that simultaneous transmission or reception on the multiple links is supported; or the capability information identifier corresponds to a third value indicates that transmission and reception on one link is supported.

According to some embodiments of the disclosure, the receiving module 520 may be configured to receive a first response message frame for the first request message frame and a second response message frame for the second request message frame.

According to some embodiments of the disclosure, the processing module 530 may be configured to: in response to the receiving module 520 receiving the second response message frame, negotiate the session key using the pairwise master key on the initial association link.

According to some embodiments of the disclosure, the processing module 530 may be further configured to: in response to the receiving module 520 receiving the first response message frame on a link to perform communication in the multiple links, negotiate the session key using the same pairwise master key on the link to perform communication.

According to some embodiments of the disclosure, the processing module 530 may be further configured to: generate a first random number on the initial association link based on a current time parameter on the initial association link; and obtain a first session key based on the pairwise master key and the first random number on the initial association link.

According to some embodiments of the disclosure, the processing module 530 may also be configured to generate a second random number on the link to perform communication based on a current time parameter on the link to perform communication; and obtain a second session key based on the pairwise master key and the second random number on the link to perform communication. According to some embodiments of the disclosure, in response to the current time parameter on the initial association link and the current time parameter on the link to perform communication being different, the first session key and the second session key are different from each other.

According to some embodiments of the disclosure, the processing module 530 may be further configured to: in response to the receiving module 520 receiving the second response message frame, establish multiple links according to the capability information identifier; in response to the receiving module 520 receiving the corresponding first response message frame on each of the multiple links, negotiate the session key using the same pairwise master key on the initial association link as well as the multiple links.

According to some embodiments of the disclosure, the processing module 530 may be further configured to: generate a corresponding third random number on each of the multiple links and the initial association link based on a current time parameter on each of the multiple links and the initial association link; and obtain a corresponding third session key based on the pairwise master key and the corresponding third random number, on each of the multiple links and the initial association link. According to some embodiments of the disclosure, third session keys may be the same as each other.

According to some embodiments of the disclosure, another communication device can also be provided as a control device on the AP side, and has a structure similar to that of the communication device 500. For example, the other communication device may include a sending unit, a receiving unit, and a processing unit. The receiving unit may receive various message frames from the communication device 500. The processing unit may control operations of the sending unit and the receiving unit, and process various message frames received by the receiving unit. For example, the processing unit may generate the random number ANonce of the AP, and process various messages when negotiating session keys with the STA. The sending unit may send various message frames to the communication device 500. However, this is only exemplary, and the communication device 500, as well as the other communication device described, may also include more or less configurations.

The above-mentioned communication device provided according to the embodiments of the disclosure enables the session key generation mechanism to satisfy requirements of multiple links and improve the network throughput.

In addition, the above-mentioned "module" or "unit" may be implemented by a combination of software and/or hardware, which is not specifically limited to the embodiments of the disclosure.

Based on the same principles as the methods provided by the embodiments of the disclosure, the embodiments of the disclosure further provide an electronic device. The electronic device includes a processor and a memory; in which, the memory is configured to store machine-readable instructions (or may referred to as a "computer program"); and a processor is configured to execute the machine-readable instructions to implement the methods described with reference to FIGS. 2 to 4.

Embodiments of the disclosure also provide a computer-readable storage medium having stored therein computer programs that, when executed by a processor, cause the method described with reference to FIGS. 2 to 4 to be performed.

In some embodiments, the processor may be a logic block, a module, and a circuit for implementing or executing various examples described in connection with the disclosure, such as a central processing unit (CPU), a generic processor, a digital signal processor (DSP), an application specific integrated circuit (ASIC), a field programmable gate array (FPGA) or other programmable logic device, transistor logic devices, hardware components, or any combination thereof. The processor can also be a combination that implements computing functions, such as a combination of one or more microprocessors, or a combination of the DSP and the microprocessor.

In some embodiments, the memory may be, for example, a read only memory (ROM), a random access memory (RAM), an electrically erasable programmable read only memory (EEPROM), a compact disc read only memory (CD-ROM) or other optical disc storage, an optical disk storage (including compact disk, laser disk, optical disk, digital versatile disk, Blu-ray disk, etc.), a magnetic disc storage medium or other magnetic storage device, or any other medium that can be used to carry or store program codes in the form of instructions or data structures and can be accessed by a computer, but is not limited to this.

It is to be understood that although the steps in the flowchart of the accompanying drawings are shown in sequence as indicated by arrows, these steps are not necessarily executed in sequence as indicated by the arrows. Unless clearly indicated in the context otherwise, the sequence of execution of these steps is not strictly limited, and these steps can be executed in other sequence. In addition, at least part of the steps in the flowchart of the accompanying drawings may include a plurality of sub-steps or stages. These sub-steps or stages are not necessarily completed at the same moment, but can be executed at different moments, and these sub-steps or stages are not necessarily performed sequentially, but can be executed alternately or alternatively with other steps or at least part of sub-steps or stages of the other steps.

Although the disclosure has been shown and described with reference to certain embodiments thereof, it will be understood by those skilled in the art that various changes in form and details can be made without departing from the scope of the disclosure. Therefore, the scope of the disclosure should not be limited to the embodiments, but should be defined by the appended claims and their equivalents.

What is claimed is:

1. A method for a communication on multiple links, comprising:
sending, by a station, a first request message frame for establishing multiple links to an access point, wherein the multiple links are established between the station and the access point; wherein the station and the access point are multi-link devices (MLDs) and the MLDs support a function of simultaneous transmission and/or reception on the multiple links at the same moment;
wherein the first request message frame at least comprises a first identifier configured to indicate the station and the access point to use a same pairwise master key to negotiate a session key on each of the established multiple links;
further comprising:
receiving, by the station, a first response message frame for the first request message frame; and
in response to receiving the first response message frame on a link to perform communication in the multiple links, negotiating, by the station, the session key using the same pairwise master key on the link to perform communication;
wherein negotiating, by the station, the session key using the pairwise master key comprises:
generating, by the station, a first random number on the initial association link based on a current time parameter on the initial association link; and
obtaining, by the station, a first session key based on the pairwise master key and the first random number on the initial association link;
generating, by the station, a second random number on the link to perform communication based on a current time parameter on the link to perform communication;
obtaining, by the station, a second session key based on the pairwise master key and the second random number on the link to perform communication;
wherein in response to the current time parameter on the initial association link and the current time parameter on the link to perform communication being different, the first session key and the second session key are different from each other.

2. The method of claim 1, further comprising:
sending, by the station, a second request message frame for establishing an initial association link, wherein the second request message frame at least comprises a capability information identifier related to the communication on the multiple links.

3. The method of claim 2, further comprising:
determining, by the station, a value corresponding to the capability information identifier,
wherein the capability information identifier corresponding to a first value indicates that simultaneous transmission and reception on the multiple links are supported;
wherein the capability information identifier corresponding to a second value indicates that simultaneous transmission or reception on the multiple links is supported; or
wherein the capability information identifier corresponding to a third value indicates that transmission and reception on one link is supported.

4. The method of claim 2, further comprising:
receiving, by the station, a second response message frame for the second request message frame; and
in response to receiving the second response message frame, negotiating, by the station, the session key using the pairwise master key on the initial association link.

5. The method of claim 2, further comprising:
receiving, by the station, a second response message frame for the second request message frame and a first response message frame for the first request message frame;

in response to receiving the second response message frame, establishing, by the station, the multiple links based on the capability information identifier; and in response to receiving a corresponding first response message frame on each of the multiple links, negotiating, by the station, the session key using the same pairwise master key on the initial association link as well as the multiple links.

6. The method of claim 5, wherein negotiating, by the station, the session key using the same pairwise master key comprises:

generating, by the station, a corresponding third random number on each of the multiple links and the initial association link based on a current time parameter on each of the multiple links and the initial association link; and obtaining, by the station, a corresponding third session key based on the pairwise master key and the corresponding third random number, on each of the multiple links and the initial association link.

7. The method of claim 6, wherein third session keys are identical to each other.

8. An electronic device, comprising:

a memory for storing a computer program; and a processor; and wherein the processor is configured to execute the computer program to:

send a first request message frame for establishing multiple links to an access point, wherein the multiple links are established between the station and the access point; wherein the station and the access point are multi-link devices (MLDs) and the MLDs support a function of simultaneous transmission and/or reception on the multiple links at the same moment;

wherein the first request message frame at least comprises a first identifier configured to indicate the station and the access point to use a same pairwise master key to negotiate a session key on each of the established multiple links;

receive a first response message frame for the first request message frame; and in response to receiving the first response message frame on a link to perform communication in the multiple links, negotiate the session key using the same pairwise master key on the link to perform communication;

wherein the processor is configured to execute the computer program to:

generate a first random number on the initial association link based on a current time parameter on the initial association link; and obtain a first session key based on the pairwise master key and the first random number on the initial association link;

generate a second random number on the link to perform communication based on a current time parameter on the link to perform communication;

obtain a second session key based on the pairwise master key and the second random number on the link to perform communication;

wherein in response to the current time parameter on the initial association link and the current time parameter on the link to perform communication being different, the first session key and the second session key are different from each other.

9. The device of claim 8, wherein the processor is configured to execute the computer program to:

send a second request message frame for establishing an initial association link, wherein the second request message frame at least comprises a capability information identifier related to a communication on the multiple links.

10. The device of claim 9, wherein the processor is configured to execute the computer program to:

determine a value corresponding to the capability information identifier, wherein the capability information identifier corresponding to a first value indicates that simultaneous transmission and reception on the multiple links are supported;

wherein the capability information identifier corresponding to a second value indicates that simultaneous transmission or reception on the multiple links is supported; or wherein the capability information identifier corresponding to a third value indicates that transmission and reception on one link is supported.

11. The device of claim 9, wherein the processor is configured to execute the computer program to:

receive a second response message frame for the second request message frame; and in response to receiving the second response message frame, negotiate the session key using the pairwise master key on the initial association link.

12. The device of claim 9 wherein the processor is configured to execute the computer program to:

receive a second response message frame for the second request message frame and a first response message frame for the first request message frame;

in response to receiving the second response message frame, establish the multiple links based on the capability information identifier; and in response to receiving a corresponding first response message frame on each of the multiple links, negotiate the session key using the same pairwise master key on the initial association link as well as the multiple links.

13. A non-transitory computer-readable storage medium having stored therein a computer program that, when executed by a processor of an electronic device, causes the electronic device to:

send a first request message frame for establishing multiple links to an access point, wherein the multiple links are established between the station and the access point; wherein the station and the access point are multi-link devices (MLDs) and the MLDs support a function of simultaneous transmission and/or reception on the multiple links at the same moment;

wherein the first request message frame at least comprises a first identifier configured to indicate the station and the access point to use a same pairwise master key to negotiate a session key on each of the established multiple links;

receive a first response message frame for the first request message frame; and in response to receiving the first response message frame on a link to perform communication in the multiple links, negotiate the session key using the same pairwise master key on the link to perform communication;

wherein negotiate the session key using the pairwise master key comprises:

generate a first random number on the initial association link based on a current time parameter on the initial association link; and obtain a first session key based on the pairwise master key and the first random number on the initial association link;
generate a second random number on the link to perform communication based on a current time parameter on the link to perform communication;
obtain a second session key based on the pairwise master key and the second random number on the link to perform communication;
wherein in response to the current time parameter on the initial association link and the current time parameter on the link to perform communication being different, the first session key and the second session key are different from each other.

\* \* \* \* \*